US005402022A

United States Patent [19]

[11] Patent Number: 5,402,022

Bertolini et al.

[45] Date of Patent: Mar. 28, 1995

[54] ELECTROMAGNETIC ROTARY ACTUATOR

[75] Inventors: Thomas Bertolini, Buehlertal; Werner Herm, Buehl-Eisental, both of Germany

[73] Assignee: Robert Bosch GmbH, Stuttgart, Germany

[21] Appl. No.: 834,277

[22] PCT Filed: Aug. 3, 1990

[86] PCT No.: PCT/DE90/00595

§ 371 Date: Feb. 12, 1992

§ 102(e) Date: Feb. 12, 1992

[87] PCT Pub. No.: WO91/03062

PCT Pub. Date: Mar. 7, 1991

[30] Foreign Application Priority Data

Aug. 16, 1989 [DE] Germany ........................ 39 26 911.6

[51] Int. Cl.⁶ ................................................ H02K 7/06

[52] U.S. Cl. ........................................ 310/37; 310/231

[58] Field of Search .................... 310/37, 40 R, 46, 89, 310/90, 231, 85, 87, 40.5, 11

[56] References Cited

U.S. PATENT DOCUMENTS

| | | | |
|---|---|---|---|
| 3,234,436 | 2/1966 | Bieger | 310/37 |
| 4,500,861 | 2/1985 | Nelson | 310/37 |
| 4,999,531 | 3/1991 | Mavadia et al. | 310/23 |
| 5,087,847 | 2/1992 | Giesbert et al. | 310/90 |

FOREIGN PATENT DOCUMENTS

| | | | |
|---|---|---|---|
| 2209246 | 6/1974 | France | 310/37 |
| 1213463 | 11/1970 | United Kingdom | 310/37 |
| 1237383 | 6/1971 | United Kingdom | 310/37 |

OTHER PUBLICATIONS

Patent Abstracts of Japan, vol. 9, No.: 110 (E-314) (1833).

Patent abstracts of Japan. vol. 5, No.: 145 (E-74) (817).

*Primary Examiner*—Emanuel T. Voeltz
*Assistant Examiner*—Matthew Nguyen
*Attorney, Agent, or Firm*—Michael J. Striker

[57] ABSTRACT

A rotary actuator (1) with magnetically acting restoring element (18), particularly for controlling a throttle cross-section, is intended to be simplified in its structure and the torque variation of the restoring element (18) is to be improved. For this purpose, the restoring element (18) is constructed of ferromagnetic but not permanently magnetic, material and arranged in the area of the permanent magnet segments (10) of the motor actuator (2). Due to the asymmetrical construction of the restoring element (18) with three short arms (22 to 24) and one extended arm (25), the maximum torque generated by the element (18) is reduced and the restoring angle, from which the element (18) returns back into its desired locking position, is increased. The rotary actuator (1) is suitable, in particular, as rotary idling actuator for internal combustion engines.

13 Claims, 2 Drawing Sheets

1
16
7
8
10
10
9
2
18
I
17
I
13
12
6
11
4
3
14
5

ELECTROMAGNETIC ROTARY ACTUATOR

BACKGROUND OF THE INVENTION

The invention relates to a rotary actuator, particularly for controlling a throttle cross-section in a line carrying operating fluid for an internal combustion engine.

An electromagnetic rotary actuator is known comprising an actuator motor having a stator which is fixed with respect to a housing in which the motor is located and a rotatable armature. Either the armature or the stator has opposing permanent magnet segments arranged symmetrically with respect to the axis of rotation. The armature or stator not having the permanent magnet segments has field windings through which current can flow to energize the rotary actuator. A magnetically acting contactless restoring element is also provided located in the field of at least one of the permanent magnets. From JP-GM-GM 60-88044, such a rotary actuator is already known which has a magnetic restoring element which, when the power supply to the motor actuator fails, moves the armature of the rotary actuator into a defined rest position. Apart from the housing-fixed permanent magnets, the known restoring element consists of two further permanent magnets connected to the armature. Due to the small torque gradient in the rest position, this leads to a relatively small restoring force. On the other hand, the maximum torque of the restoring element opposing the control torque is undesirably high.

SUMMARY OF THE INVENTION

It is an object of the present invention to provide an electromagnetic rotary actuator, particularly for throttling an operating fluid flow in an internal combustion engine, which does not have the above-mentioned disadvantages.

This object and others which will be made more apparent hereinafter are attained in an electromagnetic rotary actuator comprising an actuator motor with a stator which is fixed with respect to the housing and a rotatable armature. Either the armature or the stator has opposing permanent magnet segments arranged symmetrically with respect to the axis of rotation of the armature. The armature or stator not having the permanent magnet segments has field windings through which current flows. A magnetically acting contactless restoring element is also provided located in the field of at least one of the permanent magnets.

According to the invention the restoring element consists of a magnetizable or ferromagnetic, but not permanently magnetic, material.

By comparison, the rotary actuator according to the invention, has the advantage that the restoring element has a more advantageous torque characteristic and at the same time a much simplified structure.

Other embodiments of the rotary actuator according to the invention are possible. At least one permanent magnet segment can be axially extended so that the restoring element is located in the magnetic field of the at least one permanent magnet segment axially extended.

The restoring element can comprise a disk which has two spoke-shaped radial continuations on opposite sides of the disk extending radially opposite to each other. Each spoke-shaped radial continuation has two arms extending along an imaginary circular line from an outer end of each of the continuations. Advantageously three of the arms have substantially equal lengths but one arm is a longer or shorter so that the restoring element is unsymmetrical in cross-section. Each continuation can have a flattening or flattened portion in the vicinity of which a distance from the restoring element to the permanent magnet segment is greater than another distance from the restoring element to the permanent magnet segment in the vicinity of one of the arms. The radial width of each of the arms is advantageously less than the thickness of the disk.

In a preferred embodiment of the invention the field windings and the restoring element are arranged on the stator. The armature is cup-shaped and encircles the stator and the permanent magnet segments are arranged in an axially protruding manner on cylindrical walls of the armature. An asymmetrical cross-sectional shape of the restoring element, which produces a further reduction in the peak torque at least in one direction of rotation while simultaneously increasing the restoring angle from which the element rotates back again into its desired locking position is particularly advantageous. Using the permanent magnets of the drive also for the restoring device saves parts. The disk-shaped construction reduces the axial constructional length of the restoring device. Due to the small radial width of the arms of the restoring element, a steep zero transition is achieved in the torque/angle of rotation characteristic and thus and (sic) a more accurate maintenance of the locking point to which the element rotates back when the motor actuator is without current.

BRIEF DESCRIPTION OF THE DRAWING

The objects, features and advantages of the present invention will now be illustrated in more detail by the following detailed description, reference being made to the accompanying drawing in which.

DETAILED DESCRIPTION OF A PREFERRED EMBODIMENT

Figure 1:
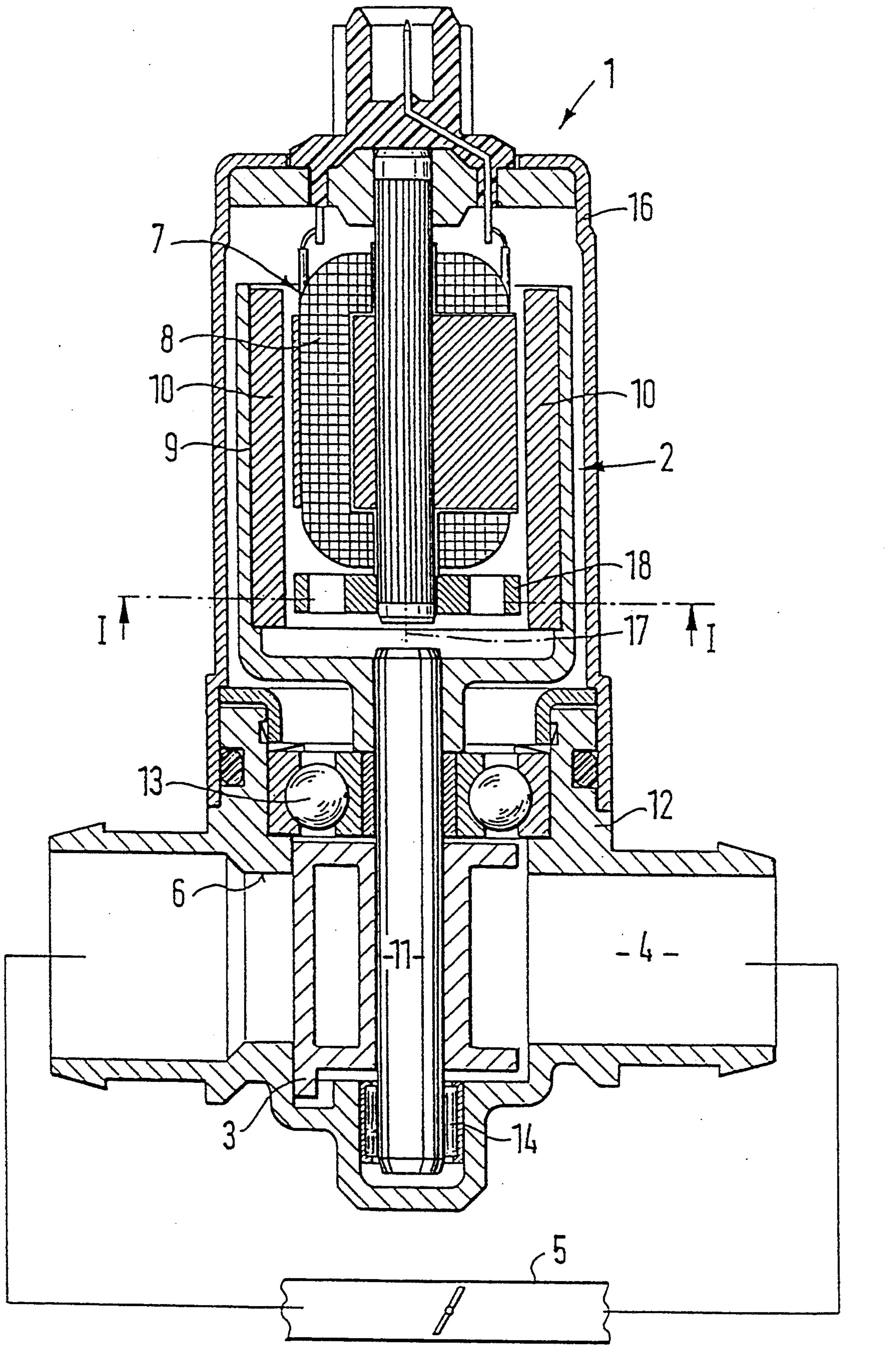
FIG. 1 is an axial cross-sectional view of an electromagnetic rotary actuator according to the present invention.

The rotary actuator 1 has a actuator motor 2, the rotatable armature 9 of which acts on a throttle member 3 which is arranged in a bypass line 4 to an intake tube 5 with throttle flap for controlling the idling combustion air of an internal combustion engine. The throttle member 3 is constructed as rotary slider which more or less closes a control opening 6 in the bypass line 4. The control opening 6 is arranged in a housing 12 in which the throttle member 3 is also accommodated. The actuator motor 2 consists of a central stator 7 with field windings 8 and a cup-shaped armature 9, acting as a rotor which has 2 permanent magnet segments 10 arranged on its cylinder-jacket-shaped wall.

These permanent magnet segments 10 are shell-shaped and cover an angular range of about 135° each. The armature 9 has a smooth shaft 11 which is supported with low friction in two bearings 13, 14 held in the housing 12. The throttle member 3 controlling the bypass line 4 is mounted on the shaft 11.

The stator 7 is mounted in a housing cap 16 which extends beyond the rotor 9 and the stator 7 and is connected to the housing 12. It carries on its shaft 17 a restoring element 18 of ferromagnetic material. The restoring element 18, like the stator 7, can thus not be rotated. It is constructed as a thin disk and is located in the field or area of action of the permanent magnet segments 10 of the armature 9, in such a manner that it radially extends near to the permanent magnets without touching the latter. The permanent magnet segments 10 extend axially beyond the restoring element 18.

Figure 2:
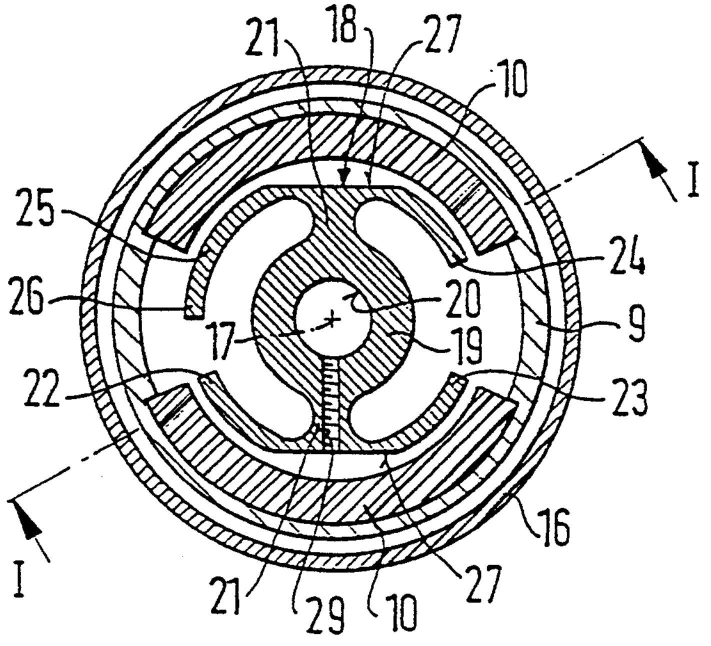
FIG. 2 is a top plan view of a restoring element of the rotary actuator shown in FIG. 1.

The restoring element 18 consists of (see FIG. 2) a center part 19, which is pushed onto the shaft 17, has a central hole 20 and carries two oppositely located radial continuations 21 extending in the form of spokes. On the outer ends of the continuations 21, two arms 22, 23, 24, 25, pointing away laterally, are in each case attached in the form of a wheel rim and extend approximately along a circular line forming the circumference of the restoring element 18. One of the arms 25 is longer than the other ones by an extension 26 in the circumferential direction. In each case two arms 22 and 23 and 24 and 25 together form a magnetisable pole of the restoring element 18. The two arms 22 and 23 together cover an angle of about 135° corresponding to the angular range of the permanent magnet segments 10. The two arms 24 and 25 cover an angular range which is greater than 135° by the angular extent of the extension 26 of about 20° to 30°. Without the extension 26, the arms 22 to 25 are arranged point-symmetrically with respect to the hole 20. Due to the extended arm 25, the restoring element 18 becomes unsymmetrical so that neither point nor axial symmetry exists. This can also be achieved by shortening one arm 25. The free ends of the arms 22 to 25 are not in any case in contact. The radial width of the arms 22 to 26 is small; in the illustrative embodiment, it is much less than the thickness of the material of the disk 18 in the direction of the axis 17. The continuations 21 of the restoring element 18 have flattenings 27 so that the distance from the permanent magnet segments 10 is there greater than at the arms 22 to 25. This reduces the permeance of the restoring element 18 at the continuations 21 as a result of which a premature clamping of the element into the next locking position, rotated by approximately 90°, is prevented. To mount the restoring element 18 in the case of a solid construction, one of the continuations 21 has a threaded hole 29 which goes through from the outer periphery to the hole 20 and into which a threaded pin can be screwed.

However, the restoring element can also be stacked from individual laminations and pressed onto the shaft.

The restoring element 18 has the task of moving the rotor, and thus the throttle member 3 into a defined position in the current-less state of the actuator motor 2, and to hold it in this position to ensure, by the throttle member in the bypass line 4, the opening of an emergency-running cross-section via which sufficient air can flow so that the internal combustion engine reliably continues to run. For this purpose, an adequate restoring torque must be available in every operating position of the throttle member 3 and the rest point of the armature, that is to say the magnetic locking point of the restoring device shown in FIG. 2 must be maintained with high accuracy. At the rest point, the arms 22 to 24 extend approximately over the same length of the permanent magnet segments 10 while the arm 26 protrudes into the gap between the permanent magnet segments formed in the circumferential direction. The peak of the restoring torque must not exceed the control torque of the actuator motor. These requirements are met by the restoring device according to the invention. Compared with a conventional rotary actuator, the torque variation with respect to the angle of rotation is flatter at the peak and, nevertheless, steep at the locking point so that the locking point remains limited to a narrow angular range of 2° to 4° (friction and hysteresis influence).

Due to the unsymmetrical construction of the restoring element, the restoring range is increased compared with a symmetrical arrangement in such a manner that, when the restoring element is used in a rotary actuator, jumping to the next locking position is also impeded. This is because, if the restoring element had a symmetrical shape, two oppositely located stronger and two weaker or unstable locking points offset by 90° with respect to the former would result. In the restoring element according to the invention, the restoring angle is increased from about 40° to about 65° at least in the direction in which the predominant control range of the motor actuator is located.

The invention is not restricted to the illustrative embodiments. Thus, it is sufficient for the restoring element function if only one of the permanent magnet segments is extended in this manner and acts on a, for example, only two-armed restoring element. Instead of a two-pole system with two opposite-pole permanent magnets 10, the magnetic restoring system can also be constructed as a four-pole system. In the illustrative embodiment, the locking points are located at the center of the permanent magnets. Instead, locking points located in the gap between the magnets, that is to say rotated by 90°, can also be constructed as operational locking points. For this purpose, the arms 22 to 25 would have to be constructed to be thicker and the flattenings 27 at the ends of the continuations 21 would have to be constructed as distinct cutouts.

While the invention has been illustrated and described as embodied in an electromagnetic rotary actuator, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and desired to be protected by Letters Patent is set forth in the appended claims.

We claim:

1. Electromagnetic rotary actuator for controlling a throttle cross-section in a line conducting fluid comprising a housing; an actuator motor having a stator fixed with respect to the housing and a rotatable armature having an axis of rotation and being rotatable relative to the stator, one of the armature and the stator having opposing permanent magnet segments providing magnetic fields and arranged symmetrically about the axis of rotation of the armature, and another of the armature and the stator having field windings through which an electric current can flow to energize the actuator motor; and a magnetically acting contactless restoring element located in the magnetic field of at least one of the permanent magnet segments and made of a magnetizable, but not permanently magnetic, material.

2. Rotary actuator as defined in claim 1, wherein the restoring element is cross-sectionally unsymmetrical in a sectional plane perpendicular to the axis of rotation.

3. Rotary actuator as defined in claim 1, wherein the restoring element has an unsymmetrical radial cross-section.

4. Rotary actuator as defined in claim 1, wherein at least one of the permanent magnet segments is axially extended so that the restoring element is located in the magnetic field of the at least one permanent magnet segment axially extended.

5. Rotary actuator as defined in claim 1, wherein the restoring element comprises a disk.

6. Rotary actuator as defined in claim 5, wherein the disk has two spoke-shaped radial continuations on opposite sides of the disk extending radially opposite to each other and each of the spoke-shaped radial continuations has two arms extending peripherally along an imaginary circular line from an outer end of each of the continuations.

7. Rotary actuator as defined in claim 6, wherein three of the arms have substantially equal lengths but one of the arms has a different length from that of the other three.

8. Rotary actuator as defined in claim 6, wherein each of the continuations has a flattening in the vicinity of which a distance from the restoring element to the permanent magnet segment is greater than another distance from the restoring element to the permanent magnet segment in the vicinity of the arms.

9. Rotary actuator as defined in claim 8, wherein the arms each have a radial width and the disk has a thickness and the radial width of each of the arms is less than the thickness of the disk.

10. Rotary actuator as defined in claim 1, wherein the field windings and the restoring element are attached to the stator.

11. Rotary actuator as defined in claim 10, wherein the armature is cup-shaped and encircles the stator and the permanent magnet segments are arranged in an axially protruding manner on cylindrical walls of the armature.

12. Rotary actuator as defined in claim 11, wherein the line is located in an internal combustion engine and the fluid is an operating fluid of the internal combustion engine.

13. Rotary actuator as defined in claim 11, wherein the housing contains a portion of the line carrying the fluid and the line is provided with a control opening, and further comprising a throttle member attached by a shaft to the rotatable armature so that, when the armature is rotated by the actuator motor, the throttle is moved to more or less close or open the control opening in the line.

* * * * *